2,841,388

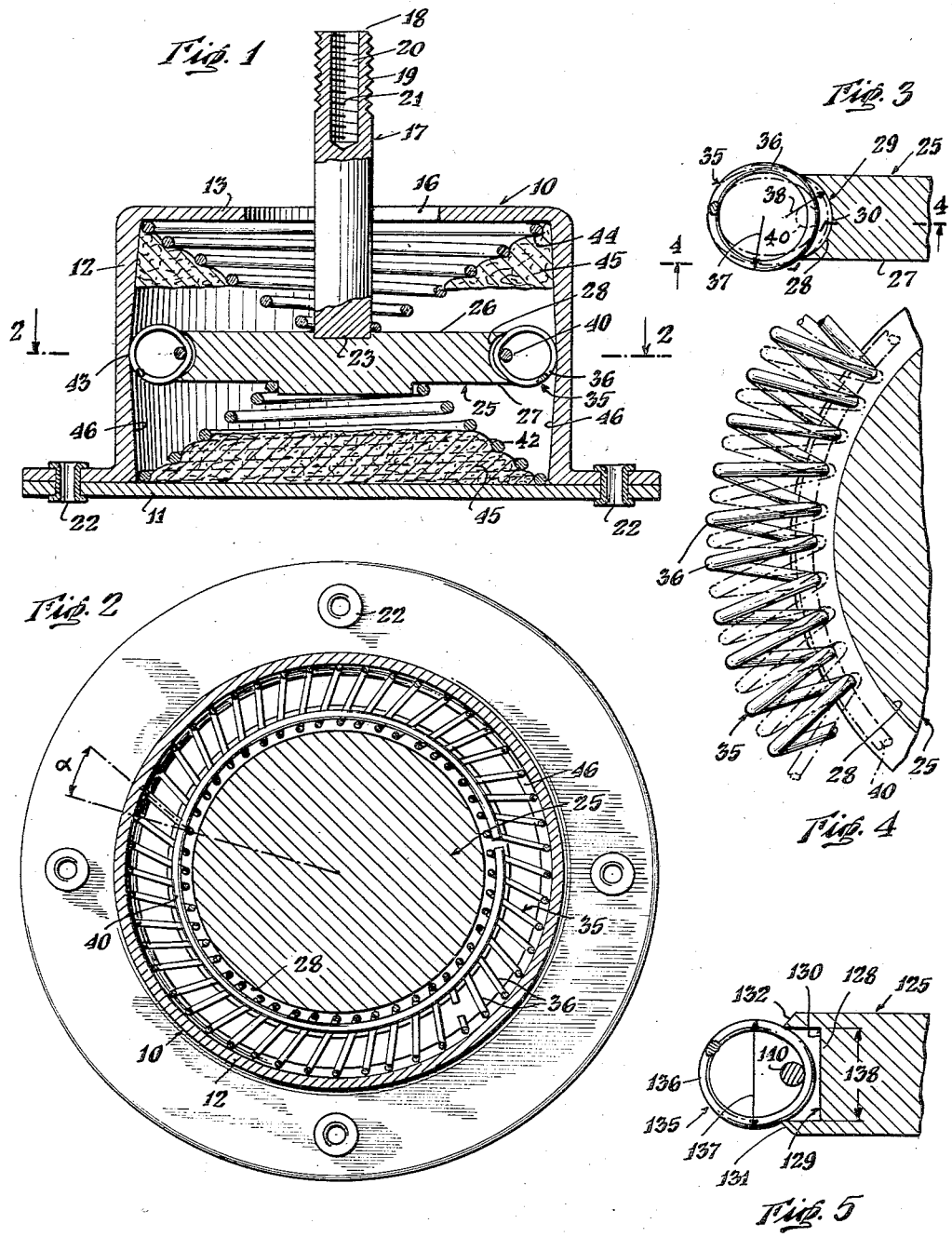

VIBRATION ISOLATORS

Lester C. Hehn, Port Washington, N. Y.

Application June 11, 1956, Serial No. 590,677

12 Claims. (Cl. 267—1)

The present invention relates to vibration isolators, and more particularly, to vibration isolators for reducing or eliminating vibrations or shocks of varying amplitudes and frequencies.

In the operation of many mechanisms, and particularly in the operation of modern, high speed aircraft, vibrations often occur over a wide range of temperature conditions, are encountered at extremely high frequencies, and vary greatly in magnitude. A general object of the present invention is, therefore, to provide an all metal vibration isolator which will be capable of operating over a wide range of temperature and which will absorb shocks or isolate vibrations which vary greatly in frequency and magnitude.

Another object of the present invention is to provide such a device which is readily and economically manufactured on a mass basis.

Since space and weight limitations are often important in vibration absorbers for aircraft and other mechanisms, a further object of the present invention has been to provide such a device which is compact in size, light in weight, and which can be readily mounted on the mechanisms in any position, above, below or on a side of the mechanism.

Another object of the present invention is to provide an all metallic vibration isolator capable of absorbing vibrations exerted from any direction or angle.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawing in which:

Fig. 1 is a side elevational view, in section and with parts broken away, showing an embodiment of the present invention;

Fig. 2 is a top sectional view, taken substantially along line 2—2 of Fig. 1;

Fig. 3 is a detailed side elevational view to an enlarged scale, in section and with parts broken away, illustrating the Fig. 1 embodiment of coil spring means before being distorted and, in dotted lines, after being distorted;

Fig. 4 is a bottom sectional view of the coil spring means shown in Fig. 3, taken substantially along line 4—4 of Fig. 1; and Fig. 5 is a side sectional view of another embodiment of the coil spring seating means of the present invention.

Referring to the drawings, in which like numerals identify similar parts throughout, it will be seen that, as illustrated in Figs. 1 to 4, inclusive, one preferred embodiment of the present invention can include a housing 10 having a base section 11, a side section 12, and a top section 13. Top section 13 is provided with an opening 16.

A load receiving member or pin 17 extends through opening 16 and is disposed substantially perpendicular to base section 11. End 18 of load receiving member 17 which extends outside of housing 10, if desired, can be provided with external screw threads 19 for affixing the vibration isolator to the equipment to be isolated or to a source in which the vibrations occur. Alternate means for affixing the vibration isolator can be used, such as welding, or end 18 can be provided with an internal bore 20 and internal threads 21.

Means for mounting housing 10 to an outside structure can be provided in the form of bolt holes 22—22 in base section 11, or the housing might be otherwise affixed to the outside structure.

Attached to inner end 23 of load receiving member 17 by welding, or other suitable means, is a plate 25. Plate 25, if desired, can be in the form of a flange or a member extending outwardly from load receiving member 17. Plate 25 has an upper surface 26, a lower surface 27 and an outer edge 28. As shown in detail in Fig. 3, the outer edge 28 of plate 25 has groove means 29 which in the preferred embodiment can be in the form of a concave groove 30.

A helical, damping, coil spring 35 having substantial flexibility, contacts groove 30. Coils 36—36 of damping coil spring 35 have an external coil radius 37 greater than radius 38 of the concave groove 30. A retaining means 40 preferably in the form of a retaining spring having substantially little flexibility is disposed within coil spring 35 and forcibly positions a portion of the coil spring within concave groove 30, thereby pivotally distorting the coils 36—36 of the coil spring to an angle α, as shown in Fig. 2, with respect to the diameter of plate 25. Coil spring 35 is shown in Figs. 3 and 4 in solid lines before being distorted by retaining means 40, and in dotted lines after being distorted. Coil spring 35 is in slidable frictional contact with the side section 12 of housing 10.

To increase the frictional contact between housing 10 and coil spring 35 the peripheral circumference of the coil spring can be made slightly larger than the inside circumference of the housing. When the coil spring 35 and plate 25 are inserted into housing 10 the coils 36—36 of the coil spring are further pivotally distorted. Coil spring 35 is, therefore, constantly exerting pressure against the side section 12 of the housing 10 and any wear between the coil spring and the side section will be taken up by the coil spring.

The frictional damping of coil spring 35 can be varied by varying the diameter of the coils 36—36 of coil spring 35, varying the number of coils, or varying the thickness of the wire of the coil spring, thereby adapting the isolator to wide ranges of load conditions.

Means to maintain the parts in a relatively assembled condition is provided preferably in the form of a frusto-conical shock and vibration absorbing spring 42 having substantial flexibility, but capable of supporting plate 25 in an approximately level position and preferably located at a central positon 43, as shown in Fig. 1, approximately half way between the base section 11 and the top section 13 of housing 10 when the vibration isolator is loaded. Shock absorbing spring 42 is disposed between the lower surface 27 of plate 25 and the base section 11. Another conically coiled shock absorbing spring 44, similar to shock absorbing spring 42, is disposed between the upper surface 26 of plate 25 and the top section 13 of housing 10.

Woven wire shock absorbing pads or buffers 45, 45, if desired, can be disposed between the plate 25 and the top section 13 and base section 11 of the housing to absorb additional shocks or vibrations and to act as a snubber in the event of severe shock conditions.

The side section 12, if desired, can form a square, a pentagon, an octagonal or other form when viewed from above, but in the preferred embodiment, as shown in Fig. 2, side section 12 of housing 10 forms a circle about coil spring 35. When the side section 12 is in the form of a circle about coil spring 35, each coil 36 of the coil spring is in contact with the side section when plate 25 is centrally located within housing 10. When side section 12 is circular and plate 25 moves laterally away from the center of the housing 10, a maximum number of individual coils 36 of the coil spring 35 are further pivotally distorted, thereby absorbing greater lateral shocks and vibrations than if the side section is of any other configuration. When plate 25 moves vertically the amount of frictional damping of coil spring 35 is greater if side section 12 forms a circle about the coil spring than if the side section is of any other configuration.

The side section 12 of housing 10, if desired, can have inner surfaces 46—46 which taper slightly inwardly from above and below the central position 43, as shown in Fig. 1. When plate 25 moves either up or down from the central position 43, the coils 36—36 of coil spring 35 will tend to be further distorted or pivoted by the decrease in the diameter of the side section 12 of housing 10, and some shocks and vibrations will thereby be absorbed by the coil spring. The tapered inner surfaces 46—46 will also tend to increase the frictional contact between coil spring 35 and housing 10 when plate 25 moves vertically or rotates about any of its horizontal axes. By tapering inner surfaces 46—46 of side section 12, the frictional damping force of coil spring 35 is varied and made non-linear with respect to the substantially vertical displacement of load receiving member 17, thereby achieving a greater amount of frictional damping at the upper and lower extremities of the vibration amplitude.

Another embodiment of groove means or coil spring seating means is illustrated in Fig. 5 at 129 and, as there shown, can include a plate 125 having an outer edge 128. Within outer edge 128 is a slot 130 having outer ridges 131 and 132 on either side of the slot. A damping coil spring 135, similar to damping coil spring 35 of the Fig. 1 embodiment, contacts slot 130. Coils 136—136 of damping coil spring 135 have an external coil diameter 137 greater than the distance 138 between ridges 131 and 132 of outer edge 128 of plate 125. Retaining means 140 having substantially little flexibility is disposed within coil spring 135 and tends to force the coil spring within slot 130. Since the distance 138 between ridges 131 and 132 is less than the diameter 137 of coils 136—136, the coils are pivotally distorted when they are forced between the ridges. Coil spring 135, if desired, can be pre-set sideways to an angle and retaining means 140 can thereby be eliminated.

When utilizing the present vibration isolator the end 18 of the load receiving member 17 is affixed to the equipment to be isolated or to the source in which the vibrations occur and housing 10 is mounted on a frame or structure. Vibrations and shocks occurring from any direction tend to move load receiving member 17 in any direction, sideways, or up and down, or tend to rotate plate 25 about its horizontal axis.

If a lateral vibration is exerted on load receiving member 17 it tends to move plate 25 laterally thereby compressing some of the coils 36—36 of coil spring 35 against side section 12 of housing 10. When coils 36—36 are compressed against side section 12, the distortion of the coils is increased and the coils tend to pivot further, thereby increasing the angle α between the diameter of plate 25 and the diameter of the coils. As plate 25 moves laterally toward side section 12 an increasing number of coils 36—36 are pivotally distorted. The side vibrations are absorbed by coils 36—36 when they are distorted and pivoted. As plate 25 moves farther towards side section 12 a greater number of coils 36—36 are pivotally distorted and the spring force of the coils tending to return plate 25 to its original position is increased.

Vertical vibrations exerted on load receiving member 17 tend to move plate 25 up or down against the frictional force between coil spring 35 and housing 10 and tend to compress either shock absorbing spring 44 or 42. When plate 25 moves from central position 43, shown in Fig. 1, the tapered inner surfaces 46—46 of side section 12 reduces the internal diameter of housing 10 and coils 36—36 of coil spring 35 will be distorted or pivoted, thereby absorbing and damping shocks and vibrations. Woven wire buffers 45, 45 will also dampen and isolate vertical shocks and vibrations.

When a combined vertical and lateral vibration is exerted upon load receiving member 17 coils 36—36 of coil spring 35 will be pivotally distorted both by the lateral movement of plate 25 and the variation in the internal diameter of the housing 10. When plate 25 is rotated about any of its horizontal axes coils 36—36 of coil spring 35 will be pivotally distorted by the variation in the internal diameter of the housing 10. The distortion of coil spring 35, the friction between the coil spring and housing 10, the compression of shock absorbing springs 42 or 44, and the compression of woven wire buffers 45, 45 will cooperate to dampen and absorb shocks and isolate vibrations exerted from any direction.

It will thus be seen that the objects set forth above, among those made apparent from the preceding description, are efficiently attained and, since certain changes made be made in the above constructions without departing from the scope of the invention, it is intended that all matter contained in the above description or shown in the accompanying drawing shall be interpreted as illustrative and not in a limiting sense.

It is also to be understood that the follownig claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A shock absorber and vibration isolator comprising, in combination; a housing having a side section; a load receiving member partially disposed within said housing; said load receiving member having means defining a groove around said load receiving member; a helical spring partially seated within said groove; said spring being juxtapositioned between said groove and said housing, with the axis formed by the centers of the coils of said spring located between said groove and said housing, and said spring being in slidable frictional contact with said housing; shock absorbing spring means limiting the movement of said load receiving member within said housing; and means to maintain the parts in relative assembled condition.

2. A shock absorber and vibration isolator comprising, in combination; a housing having a side section; a load receiving member partially disposed within said housing; said load receiving member having means defining a groove around said load receiving member; a distorted, helical spring partially seated within said groove; said spring being juxtapositioned between said groove and said housing, with the axis formed by the centers of the coils of said spring located between said groove and said housing, and said spring being in slidable frictional contact with said housing; shock absorbing spring means limiting the movement of said load receiving member within said housing; and means to maintain the parts in relative assembled condition.

3. A shock absorber and vibration isolator comprising, in combination; a housing having a side section; a load receiving member partially disposed within said housing;

said load receiving member having a concave groove around said load receiving member; a distorted, helical spring partially seated within said groove; said spring being juxtapositioned between said groove and said housing, with the axis formed by the centers of the coils of said spring located between said groove and said housing, and said spring being in slidable frictional contact with said housing; a shock absorbing spring means limiting the movement of said load receiving member within said housing; and means to maintain the parts in relative assembled condition.

4. A shock absorber and vibration isolator comprising, in combination; a housing having a tapered side section; a load receiving member partially disposed within said housing; said load receiving member having a concave groove around said load receiving member; a distorted, helical, damping, coil spring having coils which have an outside diameter greater than the distance between the edges of said groove; said spring being juxtapositioned between said groove and said housing, with the axis formed by the centers of the coils of said spring located between said groove and said housing, and said spring being in slidable frictional contact with said housing; a shock absorbing spring means limiting the movement of said load receivnig member within said housing; and means to maintain the parts in relative assembled condition.

5. A shock absorber and vibration isolator comprising, in combination; a housing having a side section; a load receiving member partially disposed within said housing; said load receiving member having a concave groove around said load receiving member; a helical, damping, coil spring having coils which have an outside diameter greater than the distance between the edges of said groove; retaining means disposed within said coil spring and forcibly positioning a portion of said coil spring within said concave groove thereby distorting the coils of said coil spring; said coil spring being juxtapositioned between said groove and said housing, with the axis formed by the centers of the coils of said spring located between said groove and said housing, and said spring being in slidable frictional contact with said housing; a shock absorbing spring means limiting the movement of said load receiving member within said housing; and means to maintain the parts in relative assembled condition.

6. A shock absorber and vibration isolator comprising, in combination; a housing having a base section, a side section, and a top section having an opening therein for a load receiving member partially disposed within said housing; said load receiving member having a means defining a groove around said load receiving member; a helical spring seated partially within said groove; said spring being juxtapositioned between said groove and said housing with the axis formed by the centers of the coils of said spring located between said groove and said housing, and in slidable frictional contact with said housing; and a shock absorbing spring means limiting the movement of said load receiving member within said housing.

7. A shock absorber and vibration isolator comprising, in combination; a housing having a base section, a side section, and a top section having an opening therein for a load receiving member; said load receiving member extending through said opening of said housing; a flange on said load receiving member having an upper surface, a lower surface, and an outer edge, extending outwardly from said load receiving member; said outer edge of said flange having means defining a groove around said flange; a helical spring seated partially within and encircling said groove; said helical spring being in slidable frictional contact with the side section of said housing; and shock absorbing springs disposed between said flange and the base section and top section of said housing.

8. A shock absorber and vibration isolator comprising, in combination; a housing having a base section, a side section, and a top section having an opening therein for a load receiving member; said load receiving member extending through said opening of said housing; a flange on said load receiving member having an upper surface, a lower surface, and an outer edge, extending outwardly from said load receiving member; said outer edge of said flange having a concave groove; a helical spring seated partially within and encircling said groove; said helical spring being in slidable frictional contact with the side section of said housing; and shock absorbing springs disposed between said flange and the base section and top section of said housing.

9. A shock absorber and vibration isolator comprising, in combination; a housing having a base section, a side section, and a top section having an opening therein for a pin; said pin extending through said opening of said housing; a flange on said pin having an upper surface, a lower surface, and an outer edge, extending outwardly from said pin; said outer edge of said flange having a concave groove; a damping coil spring in contact with said groove; the coils of said damping spring having an outside diameter greater than the distance between the edges of said concave groove; retaining means disposed within the coils of said coil spring and forcibly positioning a side portion of said damping spring within said concave groove thereby distorting the coils of said damping spring with respect to said flange; and said damping spring in slidable frictional contact with the side section of said housing.

10. A shock absorber and vibration isolator comprising, in combination; a housing having a base section, a side section, and a top section having an opening therein for a load receiving member; said load receiving member extending through said opening of said housing; a flange on said load receiving member having an upper surface, a lower surface, and an outer edge, extending outwardly from said load receiving member; said outer edge of said flange having a concave groove; a damping coil spring encircling said groove; the coils of said coil spring having a radius greater than the radius of the throat of said concave groove; a retaining spring disposed within the coils of said coil spring and forcibly positioning a side portion of said coil spring within said concave groove thereby distorting the coils of said coil spring with respect to said flange; said coil spring being in slidable frictional contact with the side section of said housing; and shock absorbing springs disposed between said flange and the base section and top section of said housing.

11. A shock absorber and vibration isolator, comprising, in combination; a housing having a base section, a side section, and a top section having an opening therein for a load receiving member; said load receiving member extending through said opening and disposed substantially perpendicular to said base section; a member attached to and extending outwardly from said load receiving member having an upper surface, a lower surface, and an outer edge, and disposed substantially parallel to said base section of said housing; said outer edge of said outwardly extending member having a concave groove; a damping coil spring having substantial flexibility encircling said groove; the coils of said damping spring having a radius greater than the radius at the throat of said concave groove; a retaining spring having substantially little flexibility disposed within said coil spring; said retaining spring forcibly positioning a side portion of said coil spring within said concave groove thereby distorting the coils of said coil spring with respect to the diameter of said outwardly extending member; said coil spring being in slidable frictional contact with the side section of said housing; and conically coiled shock absorbing springs having substantial flexibility disposed between said outwardly extending member and the base section and top section of said housing.

12. A shock absorber and vibration isolator, comprising, in combination; a housing having a base section, a tapered side section, and a top section having an opening therein for a load receiving member; said load receiving member extending through said opening and disposed substantially perpendicular to said base section; a plate having an upper surface, a lower surface, and an outer edge, attached to said load receiving member within said housing and disposed substantially parallel to said base section of said housing; said outer edge of said plate having a concave groove; a damping coil spring having substantial flexibility encircling said groove; coils of said damping spring having a radius greater than the radius at the throat of said concave groove; a retaining spring having substantially little flexibility disposed within said coil spring; said retaining spring forcibly positioning a side portion of said coil spring within said concave groove thereby distorting the coils of said coil spring with respect to the diameter of said plate; said coil spring being in slidable frictional contact with the side sections of said housing; and conically coiled shock absorbing springs having substantial flexibility disposed between said plate and the base section and top section of said housing; and woven wire buffers disposed within said housing between said plate and the top section and base section of said housing.

References Cited in the file of this patent

UNITED STATES PATENTS

| | | |
|---|---|---|
| 2,278,324 | Kollmann | Mar. 31, 1942 |
| 2,449,479 | Hopper et al. | Sept. 14, 1948 |
| 2,459,537 | Oberstadt | Jan. 18, 1949 |
| 2,525,730 | Schulze | Oct. 10, 1950 |
| 2,778,629 | Johnson | Jan. 22, 1957 |